(12) United States Patent
Harris

(10) Patent No.: US 8,217,753 B2
(45) Date of Patent: Jul. 10, 2012

(54) ELECTRONICS ANTITHEFT AUTHORIZING UNIT

(75) Inventor: Scott C. Harris, Rancho Santa Fe, CA (US)

(73) Assignee: Harris Technology, Inc., Rancho Santa Fe, CA (US)

( * ) Notice: Subject to any disclaimer, the term of this patent is extended or adjusted under 35 U.S.C. 154(b) by 729 days.

(21) Appl. No.: 12/346,768

(22) Filed: Dec. 30, 2008

(65) Prior Publication Data
US 2010/0164681 A1 Jul. 1, 2010

(51) Int. Cl.
| | | |
|---|---|---|
| G05B 19/00 | (2006.01) | |
| G05B 23/00 | (2006.01) | |
| G06F 7/00 | (2006.01) | |
| G06F 7/04 | (2006.01) | |
| G06K 19/00 | (2006.01) | |
| G08B 29/00 | (2006.01) | |
| G08C 19/00 | (2006.01) | |
| H04B 1/00 | (2006.01) | |
| H04B 3/00 | (2006.01) | |
| H04L 9/32 | (2006.01) | |
| H04Q 1/00 | (2006.01) | |
| H04Q 9/00 | (2006.01) | |

(52) U.S. Cl. ....... 340/5.54; 340/5.2; 340/5.51; 340/5.85
(58) Field of Classification Search ................. 340/5.54, 340/5.1, 5.2, 5.51, 5.73, 5.28, 5.64
See application file for complete search history.

(56) References Cited

U.S. PATENT DOCUMENTS

| | | | | |
|---|---|---|---|---|
| 5,790,074 | A | * | 8/1998 | Rangedahl et al. ...... 342/357.31 |
| 7,653,818 | B2 | * | 1/2010 | Serpa ............................ 713/184 |
| 2003/0163546 | A1 | | 8/2003 | Cheng et al. |
| 2005/0108096 | A1 | * | 5/2005 | Burger et al. ................... 705/14 |
| 2009/0015372 | A1 | * | 1/2009 | Kady ........................... 340/5.54 |

* cited by examiner

Primary Examiner — George Bugg
Assistant Examiner — Anthony D Afrifa-Kyei
(74) Attorney, Agent, or Firm — Law Office of Scott C. Harris, Inc.

(57) ABSTRACT

Locked electronic device, e.g., a device which produces a video output, such as a game console or TV. The device is shipped in a locked state, and cannot be used as a game console or a TV until it is unlocked. The unlocking is carried out by a code. The code is provided separately from the device, and only once authorized sale is detected.

23 Claims, 2 Drawing Sheets

ELECTRONICS ANTITHEFT AUTHORIZING UNIT

BACKGROUND

Theft of product inventory is an endemic problem. Products are stolen in various ways. Shoplifting and employee theft is joined by armed robberies, break-in thefts from warehouses, truck hijackings, and others. A grab and dash theft involves a person stealing an item and running out of the store before anyone can stop them.

Other improper ways of getting products includes improper import or export of goods. A so called gray good is an item that is illegally used and/or sold in a particular jurisdiction.

Sometimes goods can only be sold by authorized dealers. It is difficult to prevent other dealers from selling these devices.

For every kind of theft, the cost of these thefts are paid by the companies that eventually pass those costs on to the consumer.

SUMMARY

Many expensive devices include electronics.

According to embodiments, the intelligence in electronic devices is used to prevent improper use of stolen devices, thereby reducing the value of these items to thieves and making the theft less lucrative.

In an embodiment, an authorization is required for first activation of an electronic device. A system is provided for providing that authorization only be obtained for an electronic device that was legitimately obtained. The electronics is locked prior to authorization and is unlocked by a proper authorization.

BRIEF DESCRIPTION OF THE DRAWINGS

These and other aspects will now be described in detail with reference to the accompanying drawings, wherein.

DETAILED DESCRIPTION

Embodiments describe an antitheft/anti-shoplifting /anti-grab and dash/anti-graymarket/anti-sell by unauthorized dealer device.

According to an embodiment, an electronic device cannot be used until the device has received an authorization.

The electronic device is initially shipped in a halted mode and cannot be used until unlocked by an authorization. The authorization can only be received when there is an authorized sale. For example, in an embodiment, the electronic device can be shipped in a mode where either the hardware, software, or firmware of the electronic device is halted.

The device is initially produced and sent to be sold in a way that prevents the device from being used until activated. In one embodiment, the firmware or software that controls the electronics to operation may be halted or encrypted or missing, and not unlocked until an authorization code is entered.

The code in embodiments can be numbers, letters, or any other combination of digits or information.

The device can include at least one component specifically and solely intended for carrying out the electronically-controllable function. For example, the device can be, for example, a consumer device such as a television, game console, digital video recorder, video player such as a DVD or blu ray player, audio player such as an ipod, a cellular telephone, or computer, and can have at least one part that carries out the function of that device.

In another embodiment, the hardware may be locked and cannot be unlocked other than by an authorized code. In an embodiment, a protected switch electronically holds the processor in a halt mode. The switch is electronically released to remove the processor from the halt mode.

For example, the device may be locked into a mode which only allows authorizing and does not allow any other functions. The device may also and/or alternatively allow a mode where all of its functions can be tested, to allow the manufacturer to test the proper operation of the device before shipping.

This embodiment may be used in any electronic device which has any kind of microcontroller. For example, the anti theft devices in embodiments can be used in a smart phone or PDA; a television; a computer; a game console; or any other kind of electrically-controlled device. The electronic device cannot be used for its primary purpose, e.g. as a TV, as a game console, until the authorization is entered and the halt is removed. Operation prior to halt being removed is possible; however, that operation is only a limited mode. For example, until the halt is removed, the device may only provides the ability to enter a code to remove the halt. If the processor is halted, then there may be an auxiliary processor that allows the limited mode.

Figure 1:
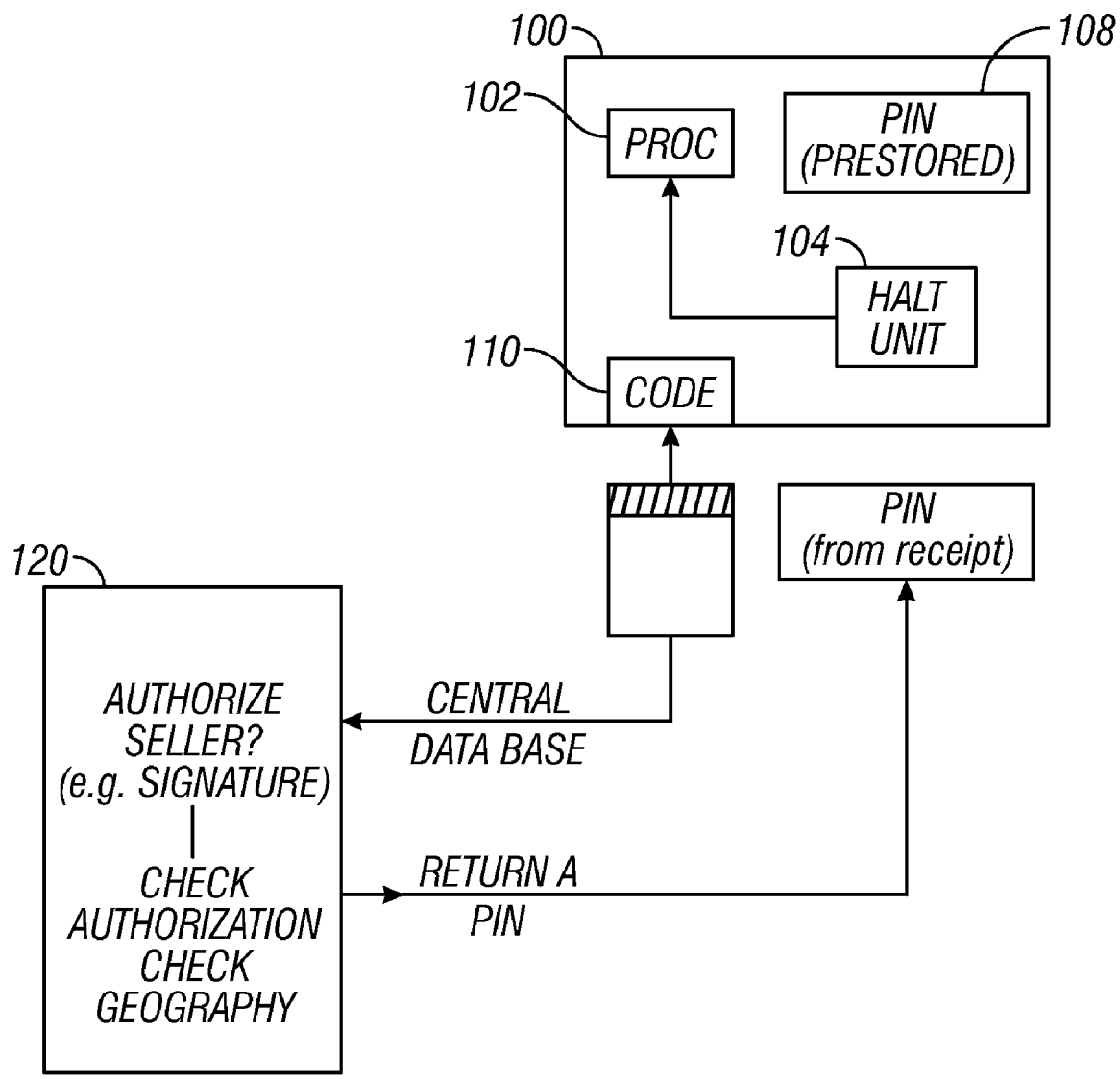
FIG. 1 shows a block diagram of where an electronic device is locked until authorized.

FIG. 1 shows a block diagram of an embodiment. The electronic device 100 has a processor 102 which controls various operations of the device. Processor 102 is controlled by a halt unit 104 that prevents the processor from operating to carry out intended functions of the unit.

Embodiments may include a television or computer or other device. The halt unit 104 may operate according to one or more prestored codes. Each unit has a separate code that is stored in the unit. An entered code needs to match the prestored code in order to unlock the operation of the device. For example, one or more codes is prestored in the unit 128. According to embodiments, the processor/default unit/code unit 100 a may be located on one side of a cryptographic boundary or located inside a physical boundary, to avoid user modification.

The default unit may be software encrypted so that the software cannot be used until properly decrypted by entering the code.

The halt unit may be a fuse that prevents the device from operating while in place. For example, the fuse can connect the halt line on a processor to ground, e.g., to prevent operation while the fuse is in place. The fuse can be permanently burned by entry of the proper code, which starts an operation that burns the fuse. Once burned, the electronic device becomes permanently operable.

According to an embodiment, a special code number is needed to unlock the device. Each unit responds to the specific code number prestored for that special code number. The code number for each unit may be assigned in any way, e.g., randomly stored or serially stored. The codes are stored in a remote database associated with information. In one embodiment, as shown in FIG. 1, the device itself can have a port shown as 110 that can be connected to a phone line or network line and can query the remote database using a serial number and/or other information. When the remote database determines that the item was properly purchased, it returns the authorization code for the item. In another embodiment, the device can display a serial number. A user can read the serial number to an operator or to an automated system. Once the purchase is verified, the system returns a code.

The code can be a four or six digit code which is entered into a user interface being displayed during the limited operation mode. When the authorized code is entered, the unit is caused to unlock.

The remote database 120 may be a database associated with the seller of the unit 100. For example, when a unit 100 is properly sold, the seller may scan the serial number and instruct a database to provide a code for initial startup of the unit.

In another embodiment, the retailer may get codes for their units. The code may be returned by the retailer's electronic register upon checkout of the item. The user then receives their code on their receipt. That code is then used to unlock the electronic device. If the user loses their code, they can always re-get it from the retailer. However, since the code is provided as part of the receipt, someone who steals the device prior to purchase does not get this code and cannot unlock the device.

Logistically, authorized sellers may get a shipment of devices, and may have a shipment of pins that are electronically transmitted to them separate from the shipment. If the shipment is stolen or otherwise pilfered, the unauthorized recipient does not get the code and cannot use these stolen devices. The code is received only once the checkout is properly completed.

However, once the retailer has the code, there is always the possibility that an employee may get the code and also steal the electronic device. Accordingly, it may be more desirable to have the central database associated with the manufacturer return codes only upon proper sale of the device.

The manufacturer database can check a number of different things: is the seller an authorized seller, is the unit in the authorized jurisdiction (gray goods), is it an authorized sale (nor has it been reported as stolen; and the like. If the unit is authorized, the code can be returned to the requester. If the unit is not authorized, the code may be withheld pending further investigation.

Figure 2:
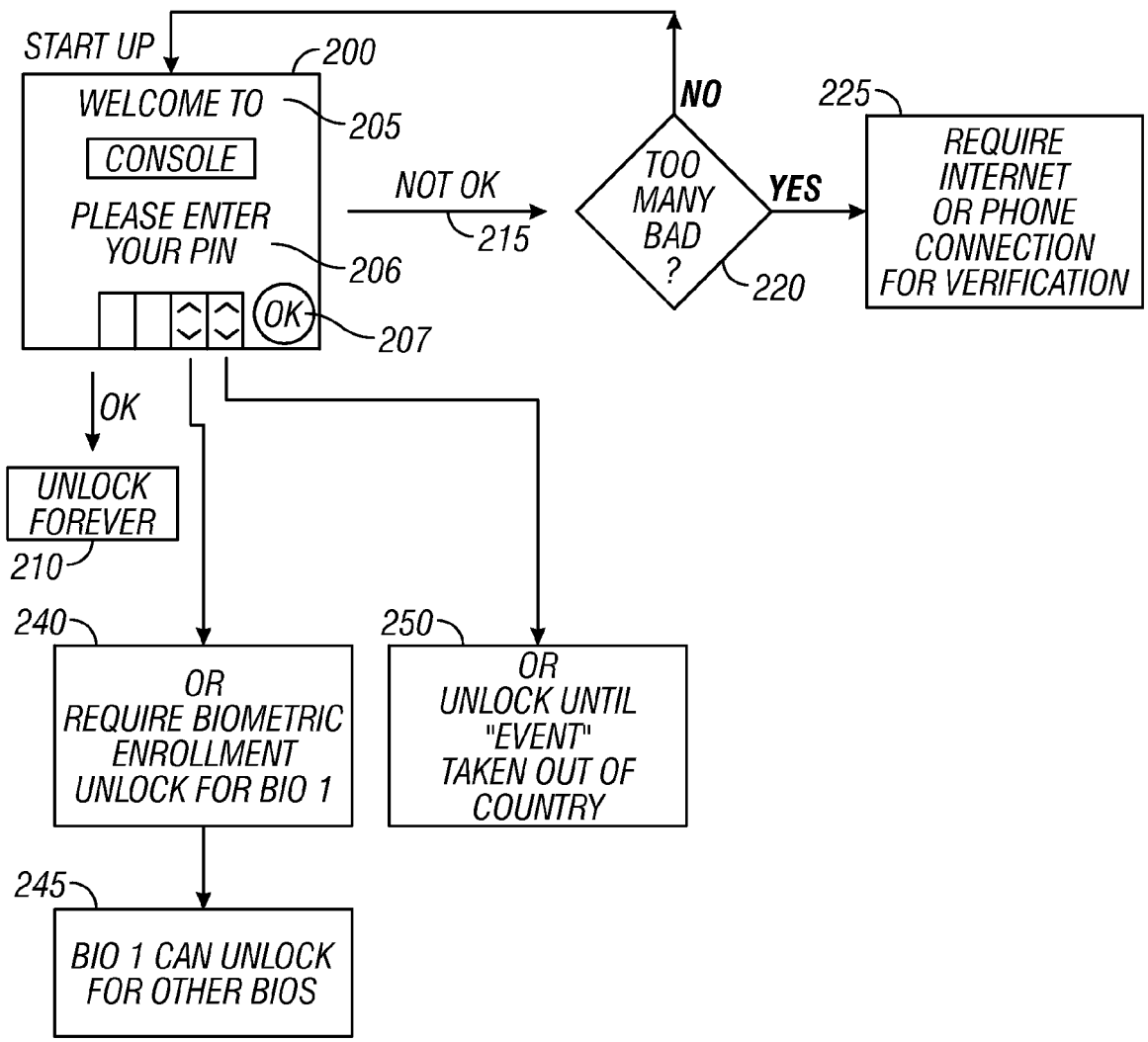
FIG. 2 shows an alternative embodiment.

On startup, the user may seem the screen 200 shown in FIG. 2. In one embodiment, the system says "welcome to the console" where the console is the name of the item being unlocked. Part 206 asks the user to enter their code. The user's code can be entered.

When the code is composed of numbers, those numbers can be entered using up and down arrows to respectively increment and decrement the numbers. The left and right arrows move between the different digits of the number. As an alternative, function keys can be reassigned for the purpose only of this initial entry. For example the screen may say press volume up to raise the number; volume down to lower the number. This allows the code to be entered. The user can then execute the okay button to indicate that the proper code has been entered.

If the code has been properly entered in this embodiment, the default unit 104 is disarmed and the console is unlocked forever. This means that the console has been properly purchased, and is not stolen. The user will never need to unlock it again. If the code is not okay at 215, the user will be given more chances. If too many bad entries are made at 220, however, security may be increased at 225. For example after the user has entered 5 or 10 bed numbers, the user may be required to enter a higher verification number where they need either Internet or phone connection for verification. This higher security verification may require two different codes to be answered, one right after the other. This may prevent users from using the brute force method of simply entering all codes.

An alternative embodiment, shown as 240 may require a biometric enrollment for unlock. For example, once the unlock occurs, the system may require an authorized user to biometrically enroll in order to be allowed to use the item. Then, at 245, only the proper users who have biometrically enrolled can use the device.

This prevents the device from being used by anyone other then the authorized user. It may also protect the contents of the device, e.g., protect a laptop from being used by someone else.

250 represents another embodiment in which the device is unlocked until an event occurs. The event may be a multiple year anniversary. For example, at five-years from the time that the device was activated, a new code needs to be entered. Other events can also cause requirement to reenter a code, such as the device being taken out of the country.

Another embodiment may enter the code in alternate ways. The code can be read from a card or other media using a camera. The code can be read from a USB memory that stores the code and where the USB memory is connected in to the device. The device reads the code off the USB memory and uses that code to verify an authorized purchase.

Other kinds of external memory other than USB memory can also be used. For example, a smart card can be used.

The code can be entered over a network, e.g., the internet. The code can be received on a cell phone, for example, and transferred from the cell phone to the device to authorize the device.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other devices can be controlled in this way. Other forms of code entry can be used. For example, a code can be provided on an external device that can be transferred to the locked unit to unlock it.

Also, the inventor intends that only those claims which use the words "means for" are intended to be interpreted under 35 USC 112, sixth paragraph. Moreover, no limitations from the specification are intended to be read into any claims, unless those limitations are expressly included in the claims.

The computers described herein may be any kind of computer, either general purpose, or some specific purpose computer such as a workstation. The computer may be a special purpose computer such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is
1. An electronic device comprising:
   at least one electronically operable component specifically and solely intended for carrying out a :first electronically-controllable function, and being controllable by a user to carry out the function:
   a code entry part that accepts entre of a code; a code recognizing part that compares an entered code against an authorized code, and produces an authorization when the entered code matches the authorized code,
   wherein said first electronically operable component includes a processor and software that runs on said processor, where said software is initially in an inoperative state that prevents said processor that operates said electronically operable component from performing said function, but where said processor can still operate in a limited mode that controls entry of the code
   wherein said first part is prevented from performing said function until said code is entered, and is permanently enabled to perform said function after said code is entered.

2. A device as in claim 1, wherein said first electronically operable part includes a processor that is initially sold in a halted mode, and wherein in said halted mode, said processor of said first part that operates said first part to perform said function is prevented from operating to perform said first function during said halted mode, and wherein said first part operates to control entry of a code during said halted state but prevents performing said function during said halted mode.

3. A device as in claim 1, further comprising a user interface that allows entry of said code while said first part is prevented from performing said function.

4. A device as in claim 1, further comprising a database that stores a list of codes, wherein each said code is associated with one specific device, and wherein said database provides said code upon detecting said authorized sale of said electronic device.

5. A device as in claim 1 wherein said software state prevents said software from carrying out said first function until said code is entered.

6. A device as in claim 1, wherein entering said code causes a permanent physical change, and, wherein said limit state is based on said physical change, such that said limit state is maintained before said physical change, and is limit state is terminated after said physical change.

7. The device as in claim 6, wherein said permanent change is an electrical connection that is permanently changed to a different electrical connection state in a way that cannot be changed back to an original connection state.

8. A device as in claim 1, wherein said code entry part is a user interface, and the same user interface that controls said electronically operable part in an operating mode of said first electronically operable part.

9. A device as in claim 1, wherein said first electronically operable part is an electronic media player, and said first function is playing electronic media.

10. A device as in claim 9, wherein said first electronically operable part is a device which produces a video output.

11. The device as in claim 1, wherein said code recognizing part runs on said processor.

12. The device as in claim 1, wherein said code recognizing part is separate from said processor.

13. An electronic device comprising:
   at least one electronically operable component specifically and solely intended for carrying out a first electronically-controllable function, and being controllable by a user to carry out the function;
   a code entry part that accepts entry of a code; a startup part, which is formed from part of said first electronically operable part, where said startup part is initially in a limit state that prevents said first electronically operable part from performing said function until said authorization is produced by said entered code matching said authorized code, and
   wherein said startup part terminates said limit state, and allows said first electronically operable part to perform said function after said authorization is produced, wherein at least a portion of said software is encrypted, and is decrypted by said entered code being entered,
   wherein said first part is prevented from performing said function until said code is entered, and is permanently enabled to perform said function after said code is entered.

14. A device as in claim 13, wherein said state that prevents said first part from performing said function until said code is entered is a hardware halt which prevents said hardware from operating until said code is entered.

15. A device as in claim 13, wherein said code entry part accepts an electronic submission of said code.

16. An electronic device comprising:
   a video producing part, that is controllable by a user to control video output:
   a startup part, where said startup part is initially in a state that initially prevents said video producing part from controlling said video output, and does not allow said video producing part to control said video output until authorized, wherein said video producing part is prevented from performing said function until authorized, and is permanently enabled to perform said function after being authorized.

17. A device as in claim 16, further comprising a code entry part that accepts entry of a code in a startup mode of said first electronically operable part, and compares an entered code against an authorized code, and produces an authorization when the entered code matches an authorized code.

18. A device as in claim 16, wherein said state is a hardware halt state, and wherein in said halt state, said video producing part is prevented from controlling said video output, but said code entry part is enabled to accept a code.

19. A device as in claim 16, wherein said video producing part uses software, where said software is initially in an inoperative state, but where said processor can still operate in a limited mode that controls entry of a code.

20. A device as in claim 16, wherein said authorization causes a permanent physical change such that said startup part prevents performing said function prior to said change, and allows performing said function after said change.

21. The device as in claim 20, wherein said permanent change is an electrical connection that is permanently changed to a different electrical connection state in a way that cannot be changed back to an original connection state.

22. A device as in claim 16, wherein said code entry part is a user interface, and the same user interface that controls said electronically operable part in an operating mode of said first electronically operable part.

23. A device as in claim 16, wherein said code entry part accepts an electronic submission of said code.

* * * * *